May 5, 1925.  1,536,730
W. T. SEARS
AUXILIARY COLUMN AND DRILL HEAD FOR RADIAL DRILLS
Filed March 20, 1922
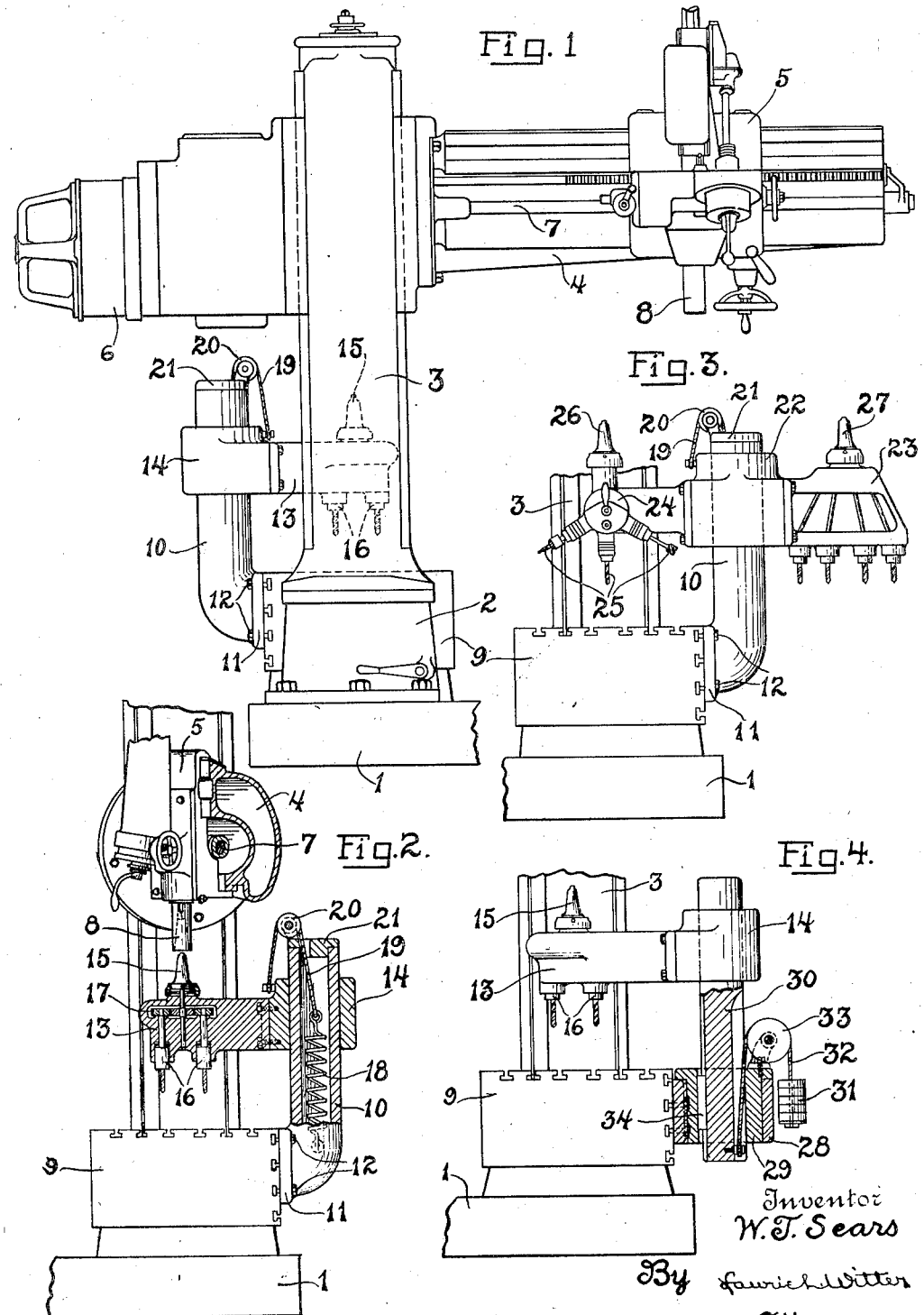
Inventor
W. T. Sears
By Laurich Witter
Attorney Patented May 5, 1925.

1,536,730

UNITED STATES PATENT OFFICE.

WILLARD T. SEARS, OF MONTCLAIR, NEW JERSEY, ASSIGNOR TO NILES-BEMENT-POND COMPANY, OF NEW YORK, N. Y., A CORPORATION OF NEW JERSEY.

AUXILIARY COLUMN AND DRILL HEAD FOR RADIAL DRILLS.

Application filed March 20, 1922. Serial No. 545,200.

*To all whom it may concern:*

Be it known that I, WILLARD T. SEARS, a citizen of the United States, residing at Montclair, in the county of Essex and State of New Jersey, have invented certain new and useful Improvements in Auxiliary Columns and Drill Heads for Radial Drills, of which the following is a specification.

This invention relates to machine tools and more especially to an attachment particularly adapted to be used in connection with a radial drilling machine whereby operations, usually performed on other machines, may be performed on such radial drill or like machine. The primary object of the invention is to provide such an attachment applicable to the work support of the main machine, adjustable to an operative position over such support or to an inoperative position away therefrom, and comprising a tool head or heads adapted to be engaged and operated by the main tool spindle of the radial drill or like machine to perform the desired tooling operations.

It is an object of the invention to provide an attachment of the above type adapted to be secured to the work support of a radial drill at the rear of the column thereof, such attachment comprising an auxiliary column, an arm thereon vertically and rotatably adjustable and provided with one or a plurality of tool heads movable with the arm to a position over or away from the work support, and counterbalance means preferably in the auxiliary column for normally holding the arm in a raised position, the tools in the head being provided with shanks adapted to be engaged by the radial drill spindle whereby the tools are driven and fed in operation.

With the above and other objects in view, my invention consists in the features of construction and operation set forth in the following specification and illustrated in the accompanying drawing. In such drawing annexed hereto and forming a part of this specification, I have shown one embodiment of my invention as applied to a radial drilling machine but it will be understood that the invention can be otherwise embodied and that the drawing is not to be construed as defining or limiting the scope of the invention, the claims appended to this specification being relied upon for that purpose.

Referring to the figures of the drawing:

Figure 1 is a front elevation of a radial drilling machine showing my invention applied thereto.

Fig. 2 is a fragmentary rear elevation thereof, the radial drill column and arm being broken away and the attachment therefor being shown in vertical section.

Fig. 3 is a detail view showing an attachment provided with a plurality of tool heads.

Fig. 4 is a view similar to Fig. 2 but showing a modified form of the invention.

Referring more specifically to the drawing by reference characters, 1 indicates the bed of a radial drilling machine on the base 2 of which is mounted for rotary adjustment a drill supporting column 3. An arm 4 is illustrated as mounted for vertical movement on the column and a drill supporting element 5 is mounted for horizontal movement along the arm. A motor 6 is provided for operating the drilling mechanism through the arm shaft 7 operatively connected to the drill spindle 8 in the usual manner.

Mounted on the bed at the rear of the column is the usual auxiliary work support 9, the arm 4 being rotatably adjustable about the column axis to position the spindle 8 over this work support. Drilling operations on large pieces of work are usually performed on the bed 1 while relatively small pieces of work are drilled on the support 9. The mechanism thus far described, within itself, comprises no part of the present invention and therefore will not be further described herein. The novel mechanism comprising the invention will now be described in detail.

The main object of the present invention is to extend the field of use of radial drills or like machines by providing an attachment therefor comprising tool supports adapted to be operated entirely by the regular drill or like spindle of the machine. The drawing illustrates one embodiment of such a construction as follows.

An auxiliary column 10 provided with a base plate 11 is illustrated as being secured to one side of the work support 9 by means of bolts 12. As illustrated in Figs. 1 and 2, a multi-spindle drill head 13 is secured to a support 14 vertically and rotatably adjustable on the column. A shank 15 is provided on the head for rotating the drill spindles 16 through gearing 17. The head is normally held in a raised position by means of a counterbalance mechanism comprising a spring 18 in the column operatively connected to the head by a cord 19. The cord 19 passes over a pulley 20 on a block 21 rotatably mounted in the top of the column. By means of such construction, the support 14 may be rotatably adjusted on the column to place the head 13 either in an operative position over the work support 9 or in an inoperative position to the rear of the column 10. In the latter position, the working surface of the support 9 is unobstructed and the regular drilling operations may be performed thereon.

In using the attachment, the head 13 is swung to position over the work support 9 as illustrated in Figs. 1 and 2. The arm 4 is then adjusted around the column 3 to bring the tool spindle 8 into alignment with the shank 15 of the head 13. The arm 4 may then be adjusted downwardly to seat the spindle 8 securely on the shank 15 and to bring the tools to a position closely adjacent the work. The arm 4 is then clamped to the column 3 and the tool spindle 8 rotated and fed downwardly in the usual manner. The tools in the head 13 are thereby driven from the spindle 8 and the head is likewise fed downwardly with the spindle, such feeding movement being against the action of the counterbalance spring 18.

In Fig. 3, I have shown a modified form of the invention wherein an arm or support 22 on the auxiliary column supports a plurality of tool heads, one head being illustrated as a multi-spindle drill head 23 and the other being illustrated as a turret 24 provided with a plurality of different tools 25 therein. It will be understood that either head 23 or 24 may be adjusted to a position over the work support 9 and that the drill spindle 8 is adapted to cooperate with the tool head shanks 26 and 27 in the same manner as above described in reference to Figs. 1 and 2. Any one of the tools 25 may be adjusted into tooling position beneath and operatively connected to the shank 27 in the usual manner.

It should be understood that the drawing is merely illustrative of the invention and that other tools and tool heads may be provided or substituted for those illustrated if desired.

A further modified form of the invention is illustrated in Fig. 4 wherein a bearing 28 is secured to the work support 9 and rotatably supports a bushing 29 therein. Mounted for vertical movement in this bearing is an auxiliary column 30 counterbalanced by a weight 31 hung on a cord 32 extending over a pulley 33. A key 34 splines the column for vertical movement in the bushing but prevents relative rotary movement of such elements. The support 14 and tool head 13 are illustrated as rigidly mounted on the column 30. This construction differs from the heretofore described mechanism principally in the fact that the column moves vertically with the tool head instead of the tool head moving relative to the column.

What I claim is:

1. In a radial drilling machine, the combination of a bed, a column mounted thereon, an arm mounted for rotary adjustment about the column axis, a drill spindle carried by the arm, an auxiliary column mounted on the bed adjacent the first named column, a tool head vertically movable thereon, and counterbalance means in the auxiliary column operatively connected to the tool head for normally holding the same in a raised position, the arm adjustment permitting the aligning of the spindle over the tool head, and the spindle being adapted to engage the tool head to drive the tools therein and to feed the head downwardly against the action of the last named means.

2. In a radial drilling machine, the combination of a column, an arm mounted for rotary adjustment about the column axis, a drill spindle carried by the arm, a work support adjacent the column, an auxiliary column adjacent the work support, a tool head vertically movable and rotatably adjustable thereon whereby the same may be moved to a position over the work support or away therefrom, and counterbalance means for normally holding the tool head in a raised position on its column, the arm adjustment permitting the aligning of the spindle over the tool head, and the spindle being adapted to engage the tool head to drive the tools therein and to feed the head downwardly against the action of the last named means.

3. In a radial drilling machine, the combination of a column, an arm mounted for rotary adjustment about the column axis, a drill spindle carried by the arm, a work support adjacent the column, an auxiliary column mounted on the work support, a tool head thereon, the head being vertically movable and rotatably adjustable whereby the same may be moved to a position over the work support or away therefrom, and counterbalance means operatively connected to the tool head for normally holding the same in a raised position, the arm adjustment permitting the aligning of the spindle over the tool head, and the spindle being adapted to engage the tool head to drive the tools therein and to feed the head downwardly against the action of the last named means.

4. In a radial drilling machine, the combination of a column, an arm mounted for rotary adjustment thereon, a drill spindle carried by the arm, a work support adjacent the column, an auxiliary column adjacent the work support, an arm vertically movable and rotatably adjustable on the auxiliary column, a plurality of relatively spaced tool heads carried by the arm about the column, the rotary adjustment of the arm permitting any of the tool heads thereon to be positioned over the work support, and counterbalance means in the auxiliary column operatively connected to the arm thereon for normally holding the same in a raised position, the adjustment of the first named arm on the column permitting aligning of the spindle thereon over the work support, and the spindle being adapted to engage the tool head over the work support to drive the tools therein and to feed the head downwardly against the action of the counterbalance means.

5. A machine tool attachment comprising the combination of an auxiliary column adapted to be supported on a work support, a multi-spindle tool head on the column, the head being vertically movable and rotatably adjustable on the column and provided with a driving shank adapted to be engaged by a driving spindle for driving and feeding the tools therein, and means for normally holding the tool head in a raised position in operation.

6. In a machine tool attachment comprising the combination of an auxiliary column adapted to be secured to a work support, an arm vertically movable and rotatably adjustable on the auxiliary column, and a plurality of relatively spaced tool heads carried by the arm about the column, the rotary adjustment of the arm permitting any of the tool heads thereon to be positioned over the work support, and the tools in the tool heads being provided with shanks adapted to be engaged by a driving spindle for driving and feeding the tools.

In testimony whereof, I hereto affix my signature.

WILLARD T. SEARS.